March 13, 1928.
G. C. ELLIOTT
COASTER
Filed April 7, 1927
1,662,146
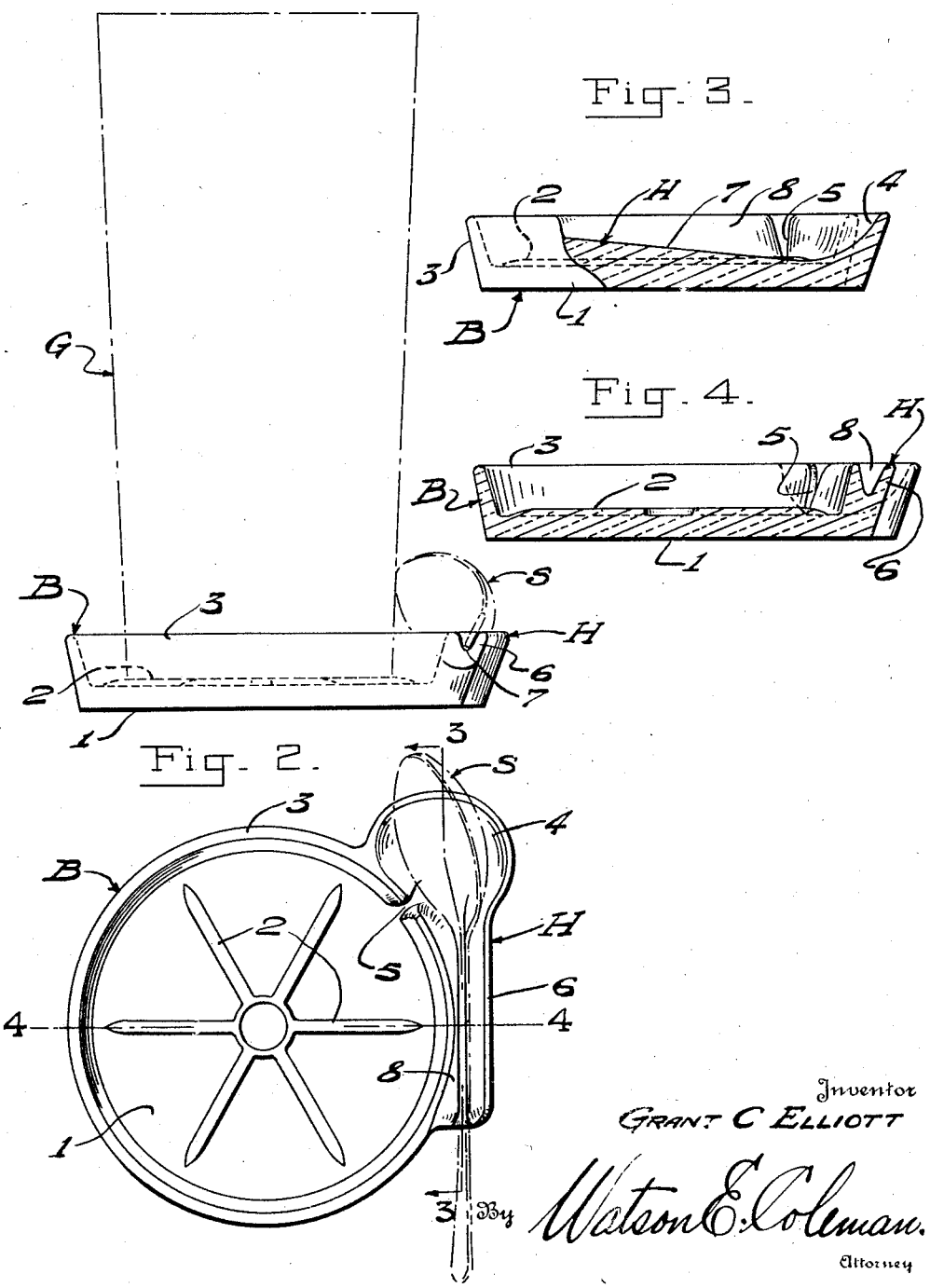
Inventor
GRANT C ELLIOTT
By Watson E. Coleman
Attorney Patented Mar. 13, 1928.

1,662,146

UNITED STATES PATENT OFFICE.

GRANT CALVIN ELLIOTT, OF WILMINGTON, NORTH CAROLINA.

COASTER.

Application filed April 7, 1927. Serial No. 181,772.

This invention relates to certain improvements in coasters and it is an object of the invention to provide a dish of this kind provided with a spoon holder and wherein the spoon holder is provided with a drain delivering to the coaster or dish.

The invention consists in the details of construction and in the combination and arrangement of the several parts of my improved coaster whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation illustrating a coaster constructed in accordance with an embodiment of my invention, an applied glass and spoon being diagrammatically indicated by broken lines;

Figure 2 is a view in top plan of the coaster as herein disclosed, an applied spoon being shown in applied position by broken lines;

Figure 3 is a sectional view taken substantially on the line 3—3 of Figure 2;

Figure 4 is a sectional view taken substantially on the line 4—4 of Figure 2.

As disclosed in the accompanying drawing, my improved coaster comprises a dishlike body B of desired dimensions and configuration having a top face of its bottom wall 1 provided with a raised design 2 of preferred type and upon which a drinking glass G or the like is adapted to be directly rested.

Formed with the peripheral wall 3 of the body B is a holder H for a spoon S. This holder H comprises a bowl portion 4 in which is adapted to be rested or arranged the bowl of the spoon. This bowl portion 4 of the holder H is formed whereby liquid dripping into the bowl portion 4 from the bowl of the applied spoon S will drain into the body B proper through a drainage groove or opening 5 formed in the peripheral wall 3 and affording communication between the interior of the body B and the bowl portion 4.

The holder H to one side of the bowl portion 4 constitutes a grooved extension 6 in which the handle of the applied spoon S is adapted to rest and, as is particularly illustrated in Figure 3, the base wall 7 of the groove 8 of this extension 6 is inclined lengthwise downwardly toward the bowl portion 4 and in communication therewith whereby liquid dripping within the grooved extension 6 will drain off into the bowl portion 4.

While the accompanying drawing illustrates the holder H arranged in accordance with one embodiment of my invention, it is to be understood that such holder may be positioned at any angle preferred intermediate the horizontal and vertical. As this, however, is believed to be arbitrary it is not thought additional illustration is required.

By having the glass G or the like resting on the raised design 2 the glass is held free from the bottom wall of the coaster proper, thus keeping the bottom of the glass comparatively free from liquid which may be within the coaster.

From the foregoing description it is thought to be obvious that a coaster constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A coaster consisting of a dish body bounded by a peripheral wall having a drainage opening directed toward the deepest point of the bottom of the body, said wall being provided at its exterior with an extension disposed transversely across said drainage opening, one end of the extension being provided with a bowl-shaped sump with which said drainage opening communicates and the other end portion of the extension being provided with a gullet, said gullet opening at one end at the end of the extension and communicating at its other end with the sump, said gullet having its longitudinal dimension disposed substantially tangentially with relation to the surface of the wall.

In testimony whereof I hereunto affix my signature.

GRANT CALVIN ELLIOTT.